H. J. FITZPATRICK.
HOSE COUPLING.
APPLICATION FILED DEC. 11, 1919.
1,363,963. Patented Dec. 28, 1920.
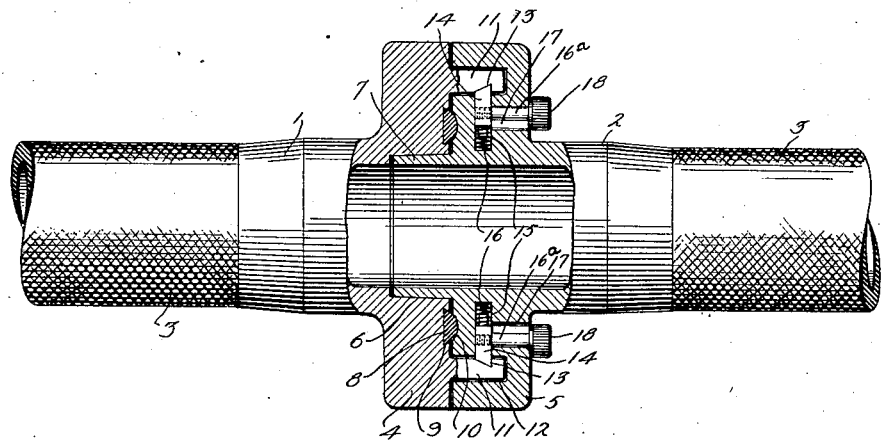
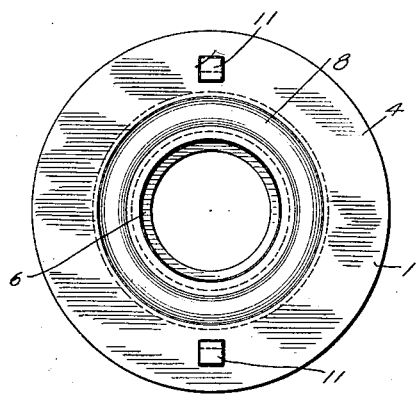 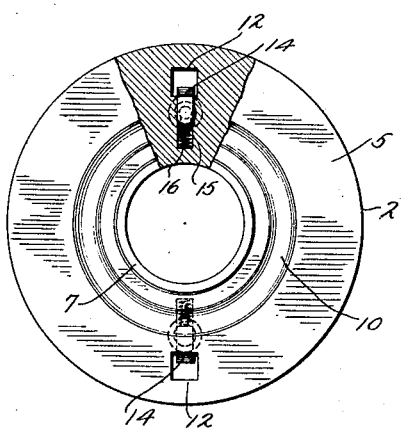
WITNESSES
Bernard Aebly
S.W. Foster
INVENTOR
H. J. FITZPATRICK.
BY
ATTORNEYS

UNITED STATES PATENT OFFICE.

HENRY JACKSON FITZPATRICK, OF ATHENS, GEORGIA.

HOSE-COUPLING.

1,363,963.  Specification of Letters Patent.  Patented Dec. 28, 1920.

Application filed December 11, 1919. Serial No. 344,018.

*To all whom it may concern:*

Be it known that I, HENRY J. FITZPATRICK, a citizen of the United States, and a resident of Athens, in the county of Clarke and State of Georgia, have invented a new and Improved Hose-Coupling, of which the following is a full, clear, and exact description.

This invention relates to improvements in hose couplings, an object of the invention being to provide a coupling which can be quickly operated to couple or uncouple and which, when in coupled position, will form a tight juncture of the parts.

A further object is to provide a coupling which dispenses with any turning movement of the members relative to each other to couple them together and which is operated by means of a longitudinal movement of the parts relative to each other.

With these and other objects in view the invention consists in certain novel features of construction, and combinations and arrangements of parts as will be more fully hereinafter described and pointed out in the claim.

In the accompanying drawings—

Figure 1 is a view partly in longitudinal section and partly in elevation illustrating my improvements;

Fig. 2 is an inner face view of one of the coupling members; and

Fig. 3 is an inner face view of the other coupling member with a portion thereof shown in section.

1 and 2 represent the two members of my improved coupling which may be secured to hose sections 3 in any approved manner. The coupling members 1 and 2 are provided with circular heads 4 and 5 respectively which are of the same diameter and which are adapted to fit snugly together when the members of the coupling are engaged. The head 4 is provided centrally with a conical or tapering recess 6 adapted to receive a tapering or conical nipple 7 on the head 5 so that a relatively long tapering telescoping engagement is had to assist in making a watertight joint and in the proper centering of the heads as they come together.

A gasket 8 is positioned between the heads 4 and 5 and is preferably located in a groove seat 9 in the head 4 and may be of the semi-cylindrical shape in cross-section illustrated, so as to enter a groove 10 in the head 5. The gasket is of sufficient width so that it is effectually compressed when the heads are together. The head 4 is provided with any desired number of longitudinally projecting lugs 11 entering recesses 12 in the head 5. I have illustrated two of these lugs 11 at opposite sides of the head, but it is obvious that I am not limited to the particular number, although two so placed will effectually perform the function desired.

The lugs 11 are made with notches 13 in their inner faces adapted to receive spring pressed locking dogs 14 mounted to move in radially positioned recesses 15 in the head 5. Coiled springs 16 are seated in the recesses back of the locking dogs 14 and said dogs have beveled outer ends so that they are forced inwardly by the lugs and spring into the notches 13 when the lugs are in coupling position. To operate these locking dogs I provide pins $16^a$ which have screw threaded engagement with the dogs and which project longitudinally through openings 17 in the head 5 and are formed with knobs or finger holds 18 on their free ends so that the operator can readily grasp these knobs 18 and by pressing them toward each other can force the locking dogs out of the notches 14 to release the lugs 11 as occasion may require.

To couple the parts, it is simply necessary to register the lugs 11 with the recesses 12 and force the members together. As the lugs 11 enter the recesses 12, they will first force the locking dogs 14 inwardly until the coupling members are fully engaged when the locking dogs will spring into the notches 13 and securely hold the parts in this position. The dogs can be released by moving the knobs 18 inwardly, as above explained, to allow a ready release of the coupling.

It will therefore be noted that with my improved device the operation is a quick one and yet the parts are securely held against accidental displacement.

Various slight changes may be made in the general form and arrangement of parts described without departing from the invention, and hence I do not limit myself to the precise details set forth but consider myself at liberty to make such changes and alterations as fairly fall within the spirit and scope of the appended claim.

I claim:

A coupling, comprising two members, one of said members having longitudinal recesses therein, notched lugs on the other member projecting into said recesses, said lug carrying member having an enlarged bore adjacent its end, an annular enlargement on the other member fitting said enlarged bore, both of said members having opposed annular grooves forming a channel, a gasket located in said channel, said lug receiving member having radially disposed recesses opening into said longitudinal recesses, spring pressed locking dogs movable in the radially disposed recesses and engageable with the notches in the lugs, pins rigidly connected to said locking dogs, said lug receiving member having longitudinal slots in which the pins are movable, and operating devices secured to the ends of the pins and movable radially over the outer face of the lug receiving member to disengage the dogs from the notches against the compression of the springs.

HENRY JACKSON FITZPATRICK.